United States Patent [19]

Taig

[11] Patent Number: 4,691,583
[45] Date of Patent: Sep. 8, 1987

[54] SELF-ADJUSTING RACK SUPPORT

[75] Inventor: Alistair G. Taig, South Bend, Ind.

[73] Assignee: Allied Corporation, Morristown, N.J.

[21] Appl. No.: 845,208

[22] Filed: Mar. 27, 1986

[51] Int. Cl.[4] .............................................. B62D 3/12
[52] U.S. Cl. ........................................ 74/422; 74/498
[58] Field of Search ................. 74/422, 498; 180/148; 280/96

[56] References Cited

U.S. PATENT DOCUMENTS

| 3,777,589 | 12/1973 | Adams | 280/96 X |
| 3,979,968 | 9/1976 | Ceccherini | 74/498 |
| 4,322,986 | 4/1982 | Adams et al. | 74/498 X |
| 4,400,991 | 8/1983 | Breitweg et al. | 74/498 |
| 4,531,603 | 7/1985 | VanCise, Jr. | 74/498 X |
| 4,553,447 | 11/1985 | Betz | 74/498 X |

FOREIGN PATENT DOCUMENTS

| 20561 | 2/1983 | Japan | 74/422 |
| 67162 | 4/1984 | Japan | 74/422 |
| 184060 | 10/1984 | Japan | 74/498 |
| 971490 | 9/1964 | United Kingdom | 74/498 |

Primary Examiner—Cornelius J. Husar
Assistant Examiner—Anthony Knight
Attorney, Agent, or Firm—Larry J. Palguta; Ken C. Decker

[57] ABSTRACT

A rack and pinion assembly (10) includes a self-adjusting rack support yoke (23) which eliminates the need for yoke (23) adjustment during initial assembly, and provides automatic adjustment of the support yoke (23) during the life of the assembly (10). A rack and pinion housing (12) receives the pinion (13) which engages the rack (20) supported for movement within the housing (12), the rack (20) engaged by the yoke support (23) biased into engagement by a main spring (40). The support yoke (23) has a recess (25) receiving therein a plug member (60), plug member (60) coupled to the support yoke (23) and having a predetermined separation (33) therebetween maintained by a spring (71). A removable member (50) having a central opening (54) is located within the housing (12) and provides sloped surfaces (52) around the central opening (54) into which extends an end (28) of the plug member (60). Another spring (100) biases a cage member (90) having roller bearing members (80) into locking engagement between the sloped surfaces (52) and the end (28) of the plug member (60). The predetermined separation (33) between the plug member (60) and yoke support (23) allows a certain predetermined amount of movement of the rack (20) relative to the pinion (13), and upward movement of the rack (20) and yoke support (23) displaces the plug member (60) upwardly so that the locking members (80) attain an adjusted position for the plug member (60) and yoke support (23).

13 Claims, 2 Drawing Figures

SELF-ADJUSTING RACK SUPPORT

The invention relates to a self-adjusting rack support yoke which provides continual adjustment of the rack's engagement with the pinion.

Rack and pinion steering mechanisms for road vehicles normally utilize a spring-loaded yoke behind the rack bar in order to force the rack into contact with the pinion and eliminate backlash. Under high load conditions, the rack tends to separate from the pinion due to the tooth engagement load acting against the rack's yoke spring. This separation must be limited to prevent loss of tooth contact between the pinion and rack. In a vehicle steering gear, the separation must be limited to a predetermined small movement comprising a few thousands of an inch in order to avoid noise in the mechanism during adverse road conditions. Two problems are commonly associated with adjustment of the rack yoke during assembly of the steering mechanism of the vehicle. First, there is required a time-consuming procedure during initial assembly by the manufacturer, wherein the biasing force of the spring against the rack support yoke is adjusted in order to effect proper engagement between the teeth of the rack and pinion. Second, after the vehicle has been in service, rack support yoke readjustment is often needed in order to compensate for long term wear and bedding-in (initial wear) between the pinion and rack.

The present invention eliminates both the initial adjustment during assembly of the vehicle and any subsequent need for adjustment during the life of the vehicle, by providing a self-adjusting rack support yoke that is equally applicable to manual and power-assisted rack and pinion steering mechanisms.

The present invention comprises a rack and pinion housing receiving therein a pinion gear for engagement with a rack slidably received within the housing. The rack is supported by a rack support yoke which is biased into engagement with the rack and forces the rack into continual engagement with the teeth of the pinion. The housing has an open end enclosed by a removable cap, the cap covering a removable member inserted into the open end and having therein a central opening. The central opening includes sloped surfaces. The support yoke includes a recess capturing an end of a plug member, the plug member biased away from the support yoke by a spring disposed between the plug member and recess, with the spring maintaining a predetermined small amount of clearance therebetween. A main spring is disposed between the removable member and support yoke in order to bias the support yoke upwardly against the rack and maintain engagement between the rack and the pinion. The plug member extends downwardly into the central opening of the removable member, and a cage member having a plurality of locking members is disposed between the end of the plug member and the sloped surfaces. The cage member is biased downwardly by a spring disposed between the caged member and support yoke. As the yoke support moves upwardly under the biasing effect of the main spring, the yoke support pulls the plug member upwardly and permits the cage member and locking members to assume an adjusted position between the sloped surfaces and end of the plug member so that the plug member cannot move downwardly. When adverse road conditions are experienced, the yoke member may move downwardly only through the predetermined small clearance between the plug member and yoke support, the plug member being prevented from any additional downward movement by the locking members which are in locking engagement between the sloped surfaces and end of the plug member.

One way of carrying out the invention is described in detail below with reference to the drawings which illustrate an embodiment in which.

Figure 1:
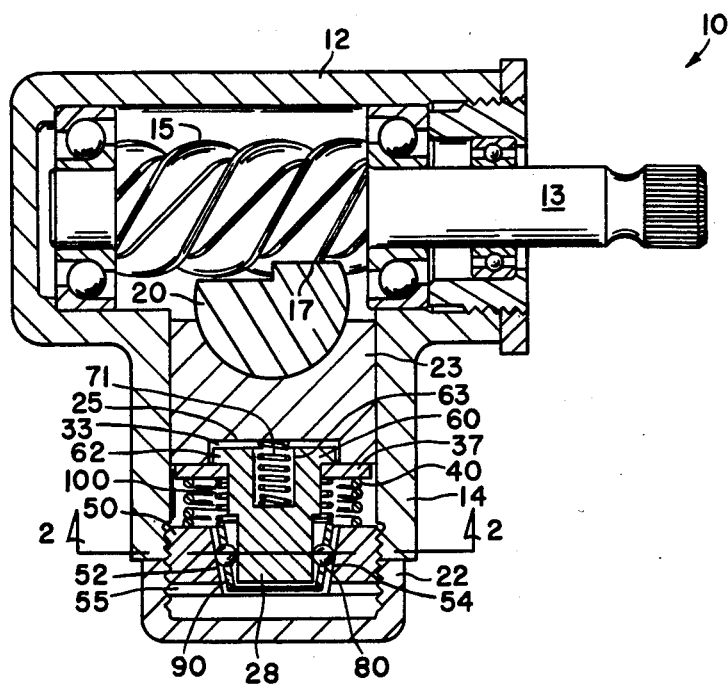
FIG. 1 is a section view of the rack and pinion assembly of the present invention.
Figure 2:
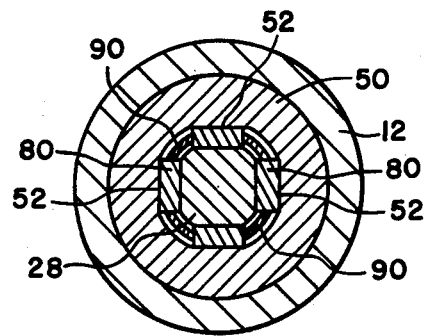
FIG. 2 is a section view taken along view line 2—2 of FIG. 1.

The rack and pinion assembly is designated generally by reference numeral 10. Rack and pinion assembly 10 comprises a housing 12 which receives therein a pinion 13 having teeth 15. Pinion teeth 15 engage teeth 17 of rack 20 which is disposed for slidable movement within housing 12. Disposed beneath rack 20 is support yoke 23 which supports the rack for continual meshing engagement of the teeth 15 and 17. Yoke 23 is biased continually upwardly against rack 20 by means of main spring 40 which engages the washer 37 at one end and the removable member 50 at the other end. Cap 22 may be threadedly removed from engagement with removable member 50 which is threadedly received within the end 14 of housing 12. The rack support yoke 23 includes a recess 25 receiving therein the end 62 of plug member 60. Plug member 60 includes an opening 63 having located therein a spring 71 which engages recess 25 to bias plug member 60 away from support yoke 23 so that the predetermined clearance 33 is continually maintained therebetween. Removable member 50 includes support or sloped surfaces 52 of central opening 54, plug member end 28 extending within central opening 54. A plurality of locking members or roller bearing members 80 are captured within a movable cage 90 biased downwardly by the spring 100. Spring 100 biases cage 90 away from the support yoke so that the rollers or locking members 80 are continually biased into engagement between the slope surfaces 52 and end 28 of the plug member. Removable member 50 has transverse key openings 55 which provide access to cage member 90 so that cage member 90 may be displaced upwardly to move locking members 80 from locking engagement between end 28 and slope surfaces 52.

It is apparent from the above description that plug member 60 is able to move upwardly with the yoke support 23 to which it is coupled, yoke support 23 being continually biased upwardly by means of main spring 40. Thus, as plug member 60 moves upwardly, roller members 80 are permitted to attain a new locking position between removable member 50 and plug end 28, so that although plug member 60 can move upwardly, it is prevented from moving downwardly due to the locking action of rollers 80 wedging between sloped surfaces 52 and end 28 of plug member 60. When any wear occurs in the rack and pinion teeth, or when the components bed down after initial assembly, plug member 60 will move upwardly to a new position to take up the additional travel. However, because of the predetermined clearance 33 between plug member 60 and yoke support recess 25, there is always permitted a slight spring loaded downward movement of the yoke through clearance 33.

During initial assembly of the adjuster assembly mechanism within the housing 12, it is necessary to render the locking members 80 ineffective so that the removable member 50 may be positioned fully into its location in the housing. For this purpose, removable member 50 provides the recessed key locations 55 so that a suitable tool may be inserted therein to depress cage 90 and hold locking members 80 out of locking contact with surfaces 52 and end 28.

The cost of the self-adjusting rack support yoke may be kept at a minimum for high production quantities by utilizing suitable materials and processes. For example, plug member 60 and removable member 50 may be made from powdered metal and the only machining required would be the external thread on member 50. A plastic roller cage and rack yoke would not require any machining.

The self-adjusting rack support yoke provides considerable advantages over prior art rack and pinion assemblies. The yoke adjustment required during the initial assembly of the rack and pinion is totally eliminated, thus saving substantial amounts of time during which previously the rack and pinion were "bedded-in" by cycling the rack and pinion assembly before initial adjustment was effected. In addition to considerable savings during assembly, there would be savings by the elimination of subsequent warranty returns for adjustments of the rack and pinion assembly. The rack support yoke would remain properly adjusted to minimize noise throughout the life of the vehicle, and because of the self-adjustment of the mechanism, the risk of service personnel manually overtightening the rack support yoke and causing a locked steering mechanism is eliminated.

Although the present invention has been illustrated and described in connection with the example embodiment, it will be understood that this is illustrative of the invention and is by no means restrictive thereof. It is reasonably to be expected that those skilled in the art can make numerous revisions and additions to the invention and it is intended that such revisions and additions will be included in the scope of the following claims as equivalents of the invention.

I claim:

1. In a rack and pinion assembly, comprising a housing receiving therein a pinion, a rack disposed within said housing and having teeth in meshing engagement with pinion teeth, a support yoke engaging and supporting said rack for engagement with said pinion, and resilient means disposed between said yoke and housing, characterized in that the resilient means includes self-adjustable locking means comprising a movable plug member coupled with said support yoke and having a self-adjusting locking mechanism disposed between said plug member and housing, a substantially flat sloped surface connected with one of said plug member and housing and engaged by said locking mechanism, and second resilient means biasing said locking mechanism into a locking position so that said locking mechanism prevents movement of said plug member away from said pinion.

2. The rack and pinion assembly in accordance with claim 1, further comprising a spring disposed between said plug member and support yoke, the spring maintaining said plug member at a predetermined separation from said support yoke.

3. The rack and pinion assembly in accordance with claim 2, further comprising a recess formed in the support yoke and receiving therein a complementary-shaped portion of said plug member, said plug member coupled to said support yoke for movement therewith.

4. The rack and pinion assembly in accordance with claim 3, further comprising an annular member abutting said support yoke, said annular member capturing an extension of the plug member within said recess.

5. The rack and pinion assembly in accordance with claim 4, wherein said plug member includes a central opening for receiving therein said spring.

6. The rack and pinion assembly in accordance with claim 4, wherein the second resilient means extends between the annular member and locking mechanism.

7. The rack and pinion assembly in accordance with claim 2, wherein said sloped surface is connected operatively with said housing and the locking mechanism comprises a roller bearing contained within a cage, the cage biased continually away from said pinion by the second resilient means.

8. The rack and pinion assembly in accordance with claim 7, further comprising a cap mounted onto said housing and forming an end portion of said housing, removal of said cap exposing said locking means.

9. The rack and pinion assembly in accordance with claim 8, further comprising a removable member including a central aperture, the central aperture having thereon the sloped surface and the plug member extending within the aperture so that the locking mechanism is located between the plug member and sloped surface.

10. The rack and pinion assembly in accordance with claim 9, wherein the removable member has openings so that insertion of a tool within said openings can effect displacement of the locking mechanism.

11. The rack and pinion assembly in accordance with claim 10, wherein the resilient means and second resilient means are positioned about said plug member and coaxial with one another.

12. In a rack and pinion assembly, comprising a housing receiving therein a pinion, a rack disposed within said housing and having teeth in meshing engagement with pinion teeth, a support yoke engaging and supporting said rack for engagement with said pinion, and resilient means disposed between said yoke and housing, characterized in that the resilient means includes self-adjustable locking means comprising a plug member coupled with said support yoke and having a locking mechanism disposed between said plug member and housing, a recess formed in the support yoke and receiving therein a complementary-shaped portion of said plug member, said plug member coupled to said support yoke for movement therewith, a sloped surface connected with one of said plug member and housing and engaged by said locking, and second resilient means biasing said locking mechanism into a locking position so that said locking prevents movement of said plug member away from said pinion.

13. In a rack and pinion assembly, comprising a housing receiving therein a pinion, a rack disposed within said housing and having teeth in meshing engagement with pinion teeth, a support yoke engaging and supporting said rack for engagement with said pinion, and resilient means disposed between said yoke and housing, characterized in that the resilient means includes self-adjustable locking means comprising a plug member coupled with said support yoke and having a locking mechanism disposed between said plug member and housing, a sloped surface connected with one of said plug member and housing and engaged by said locking mechanism, and second resilient means biasing said locking mechanism into a locking position so that said locking mechanism prevents movement of said plug member away from said pinion, wherein said sloped surface is connected operatively with said housing and the locking mechanism comprises a roller bearing contained within a cage, the cage biased continually away from said pinion by the second resilient means.

* * * * *